United States Patent [19]

Perrott et al.

[11] Patent Number: 5,959,761
[45] Date of Patent: Sep. 28, 1999

[54] INCORPORATING PHOTOCHROMIC MOLECULES IN LIGHT TRANSMISSIBLE ARTICLES

[75] Inventors: Colin Maurice Perrott, Mount Barker; Kenneth John Pidgeon, O'Halloran Hill, both of Australia

[73] Assignee: Sola International Holdings Ltd., Lonsdale, Australia

[21] Appl. No.: 08/849,333

[22] PCT Filed: Dec. 18, 1995

[86] PCT No.: PCT/AU95/00862

§ 371 Date: Sep. 8, 1997

§ 102(e) Date: Sep. 8, 1997

[87] PCT Pub. No.: WO96/18928

PCT Pub. Date: Jun. 20, 1996

[30] Foreign Application Priority Data

Dec. 16, 1994 [AU] Australia ................................. PN0072

[51] Int. Cl.$^6$ ............................... G02C 7/10; G02B 5/23
[52] U.S. Cl. ........................ 359/244; 351/159; 351/163
[58] Field of Search ................................. 359/241–244, 359/885; 351/159, 163

[56] References Cited

U.S. PATENT DOCUMENTS

| | | | |
|---|---|---|---|
| 3,212,898 | 10/1965 | Cerreta | 359/241 |
| 4,170,567 | 10/1979 | Chu et al. | 359/241 |
| 4,289,497 | 9/1981 | Hovey | 8/506 |
| 4,367,170 | 1/1983 | Uhlmann et al. | 252/586 |
| 4,968,454 | 11/1990 | Crano et al. | 359/244 |
| 5,135,298 | 8/1992 | Feltman | 351/163 |
| 5,330,686 | 7/1994 | Smith et al. | 252/586 |
| 5,708,064 | 1/1998 | Coleman et al. | 351/159 |

*Primary Examiner*—Georgia Epps
*Assistant Examiner*—Margaret Burke
*Attorney, Agent, or Firm*—Burns, Doane, Swecker & Mathis, L.L.P.

[57] ABSTRACT

A light-transmissible article formed from a polymeric material, which article includes at least one photochromic dye; and a compatible light absorbing material distributed on or within the article; the combination of photochromic dye and compatible light absorbing material is such that the depth of darkening upon activation of photochromic dye is rendered substantially uniform regardless of variations in length, thickness or local changes of surface shape.

24 Claims, 6 Drawing Sheets

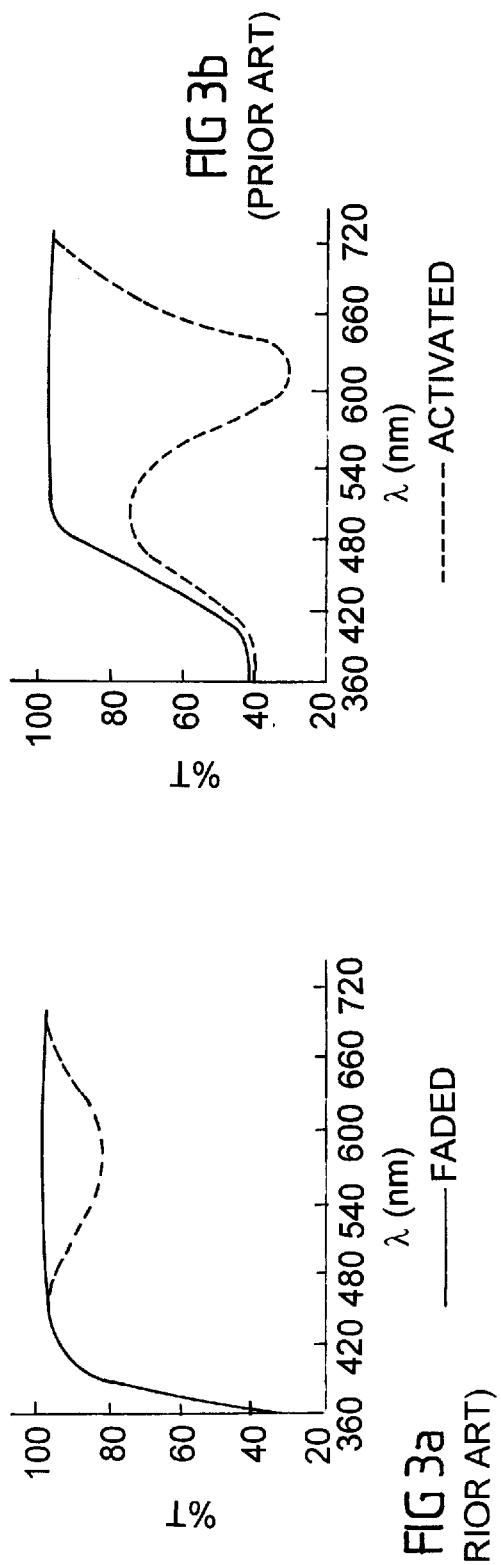
FIG 3b (PRIOR ART)
FIG 3a (PRIOR ART)
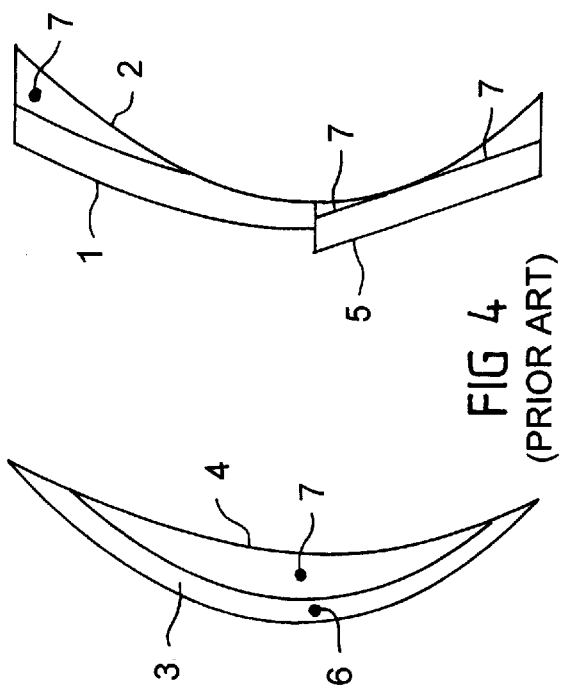
FIG 4 (PRIOR ART)

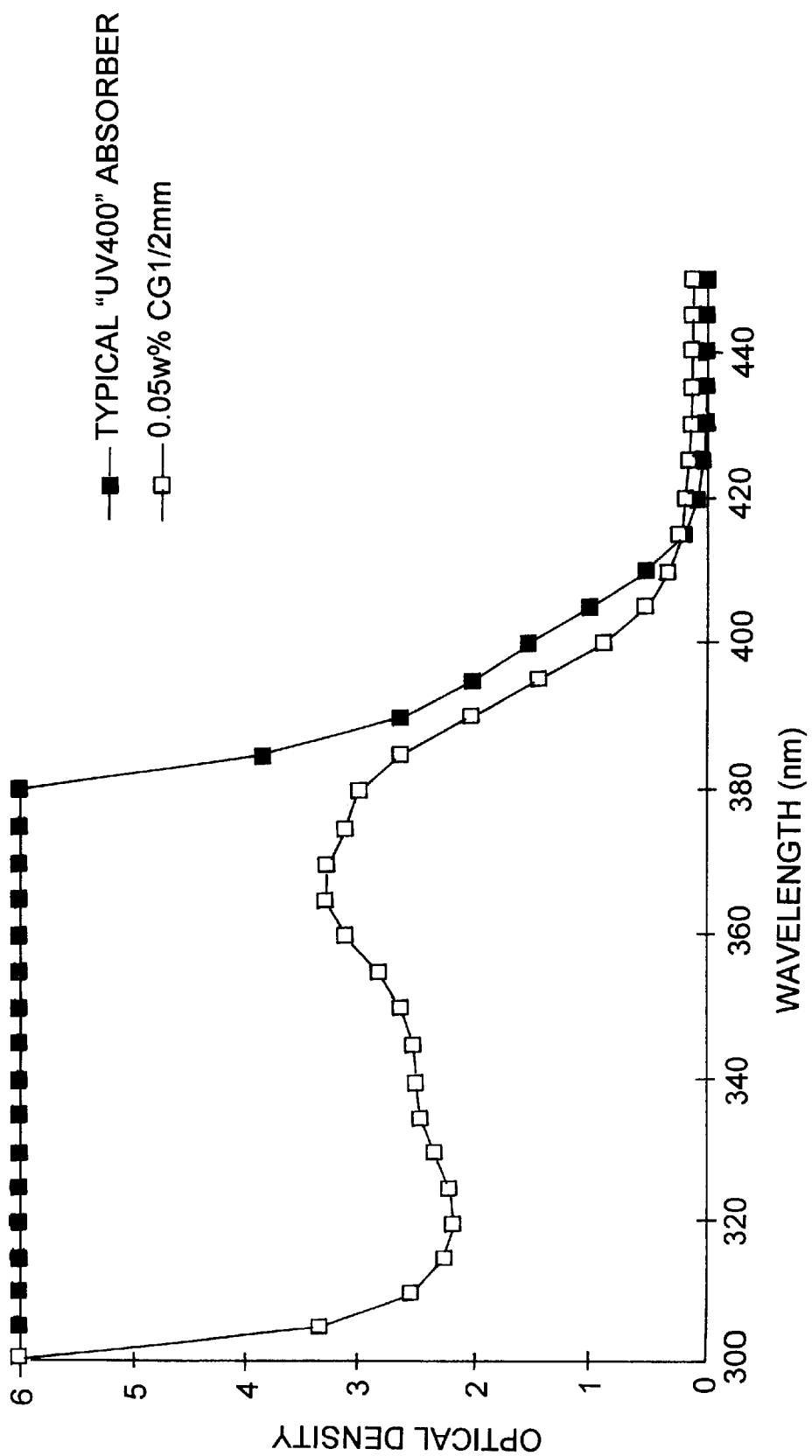

INCORPORATING PHOTOCHROMIC MOLECULES IN LIGHT TRANSMISSIBLE ARTICLES

BACKGROUND OF THE INVENTION

The present invention relates to the manufacture of plastic light-transmissible articles such as video discs, ophthalmic lenses, skylights and the like. The present invention relates in particular to light-transmissible articles including photochromic dyes and pigments.

It is known in the prior art to introduce organic molecules exhibiting photochromic properties into a number of light-transmissible articles including optical articles. Considerable effort has been expended in the prior art in finding means of applying these dyes to optical elements of varying section thickness, such as spectacle lenses. Available options for introducing dyes into the polymeric article are:

(1) Impregnation or imbibing from a fluid medium contacting the surface, (2) Incorporation of the dye in an optical coating resin applied to the lens surface(s); and (3) Impregnation or diffusive transfer from a solid or gel in contact with the polymer surface, (4) Dispersion of the dye in the monomer or thermoplastic from which the lens is to be fabricated.

In terms of case (1), applicants have found insurmountable obstacles occasioned by the chemical destruction of the dyes at the bath temperatures required to achieve a sufficient impregnation density in all ophthalmic hard resin materials, unless one utilises the techniques disclosed in Australian Patent Application PN 0071 "Method of Preparing Photochromic Article", the entire disclosure of which is incorporated herein by reference.

For case (2), applicants and others in the field have produced sample lenses which exhibit the photochromic effect. However, a lens coating must conform closely to the optical surface on which it is applied—and must adhere strongly in order to ensure product durability and to avoid deterioration over time. These two requirements limit both the thickness of a coating and the concentration of dye it can carry. Our experience is that insufficient change in lens transmission can be achieved by this approach. Coating thicknesses are in the range 2 to 4 $\mu$m.

For case (3), there is indeed a viable method exploited commercially by Transitions Optical, Inc. (see for example U.S. Pat. No. 4,968,454 & U.S. Pat. No. 5,021,196) to achieve a satisfactory lens product. Dyes are incorporated, e.g. by imbibing beneath the lens surface furthest from the eye and the completed plastic element is coated with an abrasion resistant resin. This system however relies on the use of a specific lens material developed and sold by PPG Industries, Inc. (for example codes CR300–307 and CR407).

For case (4), many attempts have been made in the prior art to incorporate dyes in a variety of ophthalmic resins and thermopolymers. The technical issues to be overcome relate primarily to ensuring that the dyes are not destroyed by the initiators employed to cure a monomeric volume, producing a solid lens with optical integrity, or to ensure that a thermoplastic article can be formed at temperatures which have least detrimental effect on the dyes.

It is possible to achieve satisfactory results in casting lenses from tetraethylglycol dimethacrylate (U.S. Pat. No. 4,851,471 and U.S. Pat. No. 4,913,544) with a thermal cure system, in casting lenses from radiation curable systems (U.S. Pat. No. 4,912,185 & Application No 07/781392), and in thermal moulding of polycarbonate impregnated with photochromic dye stuff (U.S. Pat. No. 94/04225 and U.S. Pat. No. 94/04233). By modifying the chemistry of the monomer, Enichem Synthesis Spa have achieved a combined monomer/catalyst system which allows the incorporation of some selected organic dyes (including photochromic dyes) into a modified allyl diglycol carbonate (see U.S. Pat. Nos. 5,186,867 and 5,180,524). The catalyst employed is Luperox 231 from Elf-Atochem, which has no significant action on the families of organic molecules of interest. It has the chemical formula 1,1-Bis(t-butyl peroxy)-3,3,5-trimethylcyclohexane.

Applicants experience with conventionally known photochromic molecules incorporated into the lens is that both a desirable depth of darkening and a significant extension of fatigue life can be demonstrated. This is due, in part, to the reservoir of dye dispersed throughout the lens but is influenced also by the lower concentrations of oxygen and moisture within the bulk of the lens compared to near its surface. Both are known to accelerate fatigue of the photochromic dyes.

The lenses thus produced are found to be useful as sunglass lenses, but not as spectacle lenses with refractive power. This is because the optical density of an activated lens is greatest where the lens design causes the material thickness to be greatest. A refracting lens must, by definition, have bounding surfaces of different curvature. Thus its thickness will change according to the lens surface configurations to achieve the desired through power being provided. Furthermore, one surface—usually the front surface—may have localised curves or segments to provide multifocal or progressive addition for near vision. As a result of these physical design requirements, a so-called "body tinted" photochromic lens shows definite radial and local variations in colour density when activated.

These variations are unacceptable to a spectacle wearer on the grounds of utility and of cosmetic appearance. As noted above, the requirement for uniform depth of darkening can be met only when the lens containing the photochromic material is of uniform thickness. That is, when it has no power of refraction.

BRIEF SUMMARY OF THE INVENTION

It is accordingly an object of the present invention to overcome, or at least alleviate, one or more of the difficulties and deficiencies related to the prior art.

Accordingly, in a first aspect of the present invention there is provided a light-transmissible article formed from a polymeric material, which article includes at least one photochromic dye; and a compatible light absorbing material distributed on or within the article;

the combination of photochromic dye and compatible light absorbing material is such that the depth of darkening upon activation of photochromic dye is rendered uniform regardless of variations in length, thickness or local changes of surface shape.

By the term "compatible light absorbing material", as used herein, we mean that the light absorbing material exhibits substantial, preferably complete overlap in its absorbance spectrum with the spectrum of the photochromic dye, in the region of photochromic activation.

Desirably the concentrations of photochromic dye and compatible light absorbing material is selected such that the maximum difference in light intensity, e.g. UV light intensity, emerging from surface distal the light source is less than approximately 10%, preferably less than approximately 5% of the total intensity absorbed during passage through the article. This percentage is directly proportional to the change in depth of darkening.

Preferably the light-transmissible article includes approximately 0.001% to 0.25% by weight, based on the total weight of the article of the photochromic dye; and approximately 0.001% to 1.0% by weight, based on the total weight of the article of the compatible light absorbing material.

The light-transmissible article according to the present invention may take any suitable form. The light-transmissible article may be an ophthalmic article, for example a sunglass lens or spectacle lens, or industrial article such as a sun light or moon roof.

The polymeric material utilised in the manufacture of the light-transmissible article may be of any suitable type. A polycarbonate material may be used. An optical material of the allyl diglycol carbonate type may be used. The light-transmissible articles may be formed from cross-linkable polymeric casting compositions, for example as described in applicant's U.S. Pat. No. 4,912,155, U.S. patent application No. 07/781,392, Australian Patent Applications 50581/93, 50582/93, European Patent Specification 543149A2, or co-pending Provisional Patent Application PN 0073 entitled "Heat Responsive Articles", the entire disclosures of which are incorporated herein by reference.

Such cross-linkable polymeric casting compositions may include a diacrylate or dimethacrylate monomer (such as polyoxyalkylene glycol diacrylate or dimethacrylate and a polymerisable comonomer, e.g. methacrylates, acrylates, vinyls, vinyl ethers, allyls, aromatic olefins, ethers, polythiols, epoxies and the like.

The polymerisable comonomer may be a low viscosity comonomer. The low viscosity comonomer may be of any suitable type. The low viscosity comonomer may be selected from one or more of aromatic olefins, polymerisable bisphenol monomers capable of forming a homopolymer having a high refractive index of more than 1.55, urethane monomers having 2 to 6 terminal acrylic or methacylic groups, and thiodiacrylate or dimethacrylate monomers.

The aromatic olefins may be selected from styrene, divinyl benzene and 3,9-divinyl-2,4,8,10-tetraoxaspiro [5.5] undecane (DTU). The aromatic olefins may be present in amounts of approximately 5 to 50% by weight.

The thiodiacrylate or dimethacrylates may be selected from bis(4-methacryloylthioethyl)sulfide (BMTES) and bis (4-methacryloylthiophenyl)sulfide (BMTS or TS). The thiodiacrylate may be present in amounts of from approximately 5 to 40% by weight, preferably 20 to 40% by weight.

The polyoxy alkylene glycol diacrylate or dimethacrylate compound according to the present invention may include ethylene oxide or propylene oxide repeating units in its backbone. A polyethylene glycol dimethacrylate is preferred. One suitable material is that sold under the trade name NKESTER 9G by Shin Nakamura. Alternatively, an NK Ester 6G, 4G or 14G may be used.

The polyoxy alkylene glycol diacrylate or dimethacrylate component may be present in amounts of from approximately 5% by weight to 60% by weight based on the total weight of the casting composition.

The high index bisphenol monomer component in the cross-linkable casting composition may be selected from: dimethacrylate and diacrylate esters of bisphenol A; dimethacrylate and diacrylate esters of 4,4'bishydroxyethoxy-bisphenol A and the like.

The high index bisphenol monomer may be present in amounts of from approximately 10 to 60% by weight, preferably 20 to 55% by weight, based on the total weight of the casting composition.

The cross-linkable polymeric casting composition may include a urethane monomer having 2 to 6 terminal acrylic and/or methacrylic groups. Suitable materials falling within this definition include materials supplied under the trade names U-4H, U-4HA and U-6HA by Shin Nakamura, NF-201 and NF-202 by Mitsubishi Rayon.

The urethane monomer may be present in amounts of from approximately 2.5% to approximately 35% by weight, preferably 5% to 25% by weight, based on the total weight of the casting composition.

In a preferred aspect of the present invention the cross-linkable polymeric coating composition may further include at least one poly-functional unsaturated cross-linking agent.

The poly functional unsaturated cross-linking agent according to the present invention may be a tri- or tetra-functional vinyl, an acrylic or methacrylic monomer. The cross-linking agent may be a short chain monomer for example trimethylol propane trimethacrylate, pentaerythritol triacrylate or tetracrylate, or the like. Other polyfunctional cross-linking agents which may be used include NK Ester TMPT, NK Ester A-TMPT, NK Ester A-TMM-3, NK Ester A-TMMT, di-trimethylol propane tetraacrylate, trimethylolpropane triacrylate, pentaerythritrol tetramethacrylate, dipentaerythritol monohydroxypenta acrylate, pentaerythritol triacrylate, ethoxylated trimethylolpropane triacrylate, ethoxylated trimethylol- propane trimethacrylate.

The polyfunctional unsaturated cross-linking agent may be present in amounts of from approximately 5 to 45% by weight, preferably approximately 30 to 40% by weight based on the total weight of the casting composition.

The cross-linkable casting composition may further include a co-reactant including a polythiol.

The polythiol may be selected from the group consisting of pentaerythritol tetrakis (3-mercapto-propionate) [PTMP], trimethylolpropane tris (3-mercapto-propionate) [TTMP], 4-mercaptomethyl-3,6-dithia-1,8-octanedithiol [MDO], pentaerythritol tetrakis (3-mercaptoacetate) [PTMA], trimethylolpropane tris (3-mercaptoacetate) [TTMA], 4-t-butyl-1,2-benzenedithiol, 2-mercaptoethylsulfide, 4,4'-thiodibenzenethiol, benzenedithiol, glycol dimercaptoacetate, glycol dimercaptopropionate ethylene bis(3-mercaptopropionate), polyethylene glycol dimercaptoacetates, polyethylene glycol di(3-mercaptopropionates).

The thiol compound may be present in amounts from 0 to approximately 50% by weight.

Such polymeric formulations may be UV cured or cured by a combination of UV and thermal treatment. The range of optical lenses sold under the trade designation "Spectralite" by Applicants have been found to be suitable.

Whilst we do not wish to be restricted by theory, the present invention is based on the following postulations.

The wavelengths of light passing through a lens or other light-transmissible article may be manipulated in the fine details by selecting specific absorbers and concentrations at which they are included within the lens, as for example in U.S. Pat. No. 5,149,183. Typical spectacle lenses have cross-sectional detail as shown in FIG. 1.

In FIG. 1, the following legend is used:
A. Spectacle lens with negative refractive power
B. Spectacle lens with positive refractive power
C. Lens as A, but having bifocal addition
  1. Front surface of negative lens
  2. Rear surface of negative lens 3. Front surface of positive lens
4. Rear surface of positive lens
5. Front element giving power addition for near vision (bifocal)

The range of thickness may vary by an order of magnitude between centre and edge. Light passing through a lens at any point enters the front surface (1) at an initial intensity $I_o$, beyond which it is absorbed at a rate characteristic of the lens material and the organic molecules dispersed within that material. If distance of passage behind the lens surface (1) is denoted as x, the density declines as $$l_{(x)} = l_o \exp(-xA)$$

Where A is an absorption coefficient for the wavelengths in question. Accordingly, the light intensity declines as per FIG. 2 as it traverses the lens. This decline persists until the light exits the back surface (2), beyond which it continues undissipated.

The mean intensity of light exiting the lens declines as the thickness of the lens increases. This is shown in FIG. 2 for the sequence of lens thicknesses X, X' and X" occasioned by increasing displacement of the point of exit through surface (2) from the front surface (1). At some point, this distance becomes sufficient that negligible light intensity emerges from the lens. If this spacing is designated as X=L, per FIG. 2, all lens thicknesses with X>L will prevent the exit of light through the lens. At such conditions, the lens can be regarded as "blocking" the relevant wavelength of light.

This provides a means by which to control the depth of coloration achieved when photochromic molecules are activated during the passage of specific light frequencies through the lens, as depicted in FIG. 2. The total number of molecules activated is proportional to the integral of the passing light intensity along the path x=O to x=X, or $$N(1-e^{-XA}).$$

Where X exceeds the practical value at which the intensity has been reduced to zero, X=L, the number of activated molecules achieves a constant value (If $l_{(x)}$=O at x=L, $e^{-XA} \cong O$). In this case, the number of activated molecules following the passage of light into the lens is independent of the lens thickness.

The practical implication of the above is that, provided a photochromic dye or pigment is dispersed with another organic molecule which absorbs in sufficient strength at the activation wavelength of the photochromic molecule, the condition may be achieved where the self absorption length L for the appropriate wavelengths is always less than the least thickness of any lens. This thickness is typically in the range of approximately 1.0 to 8.0 mm for finished spectacle lenses, or half that range for components to be laminated.

Accordingly, therefore, applicants have been able to formulate body tinted articles including lenses with a photochromic dye associated with a specific light absorber, e.g. a UV absorber, which has appropriate covering absorption in the photochrome activation region so that the depth of coloration observed on activating the photochromic is uniform for all section thicknesses. The photochromic effect is activated in a region of depth L behind the front surface of the lens, as depicted in FIG. 2. The specific light absorber may, incidentally, also function as a second photochromic dye.

The light absorbing molecules should preferably be used at the least concentration consistent with the application. Limiting the penetration depth of activating wavelengths requires a compensating increase in the level of photochromic dye required. This increases cost and alters the response of surface layers to coating treatments. We have found it sufficient to adjust formulation details so that the lens contains photochromic dye and a selected absorber in such concentrations that the difference in intensity of activating wavelengths emerging from the rear surface of the lens is no greater than approximately 10% of the mean of that emerging from the thinnest and thickest sections. Preferably, this should be less than approximately 5% of the mean.

The photochromic dyes or pigments utilised in the process of the present invention are generally activated by near UV light, in the range of wavelengths from approximately 320 nm to 450 nm. Their activation has little effect on their transmission characteristics in that wavelength range, but has a major impact on their transmission in the visible part of the spectrum, as shown in FIG. 3 (graph A is for a known blue coloring spiro-oxazine: graph B is for a spiro-indoline-oxazine colour shifted to longer wavelengths). The pigment (s) or dye(s) including photochromic dye(s) may be selected from the group consisting of anthraquinones, phthalocyanines, spiro-oxazines, chromenes, pyrans including spiro-pyrans and fulgides.

Examples of preferred photochromic dyes may be selected from the group consisting of 1,3-dihydrospiro[2H-anthra[2,3-d]imidazole-2,1'-cyclohexane]-5,10-dione 1,3-dihydrospiro[2H-anthra[2,3-d]imidazole-2,1'-cyclohexane]-6,11-dione 1,3-dihydro-4-(phenylthio)spiro[2H-anthra'1,2-diimidazole-2,1'-cyclohexane]-6,11-dione 1,3-dihydrospiro[2-H-anthra[1,2-dimidazole-2,1'-cycloheptane]-6,11 -dione 1,3,3-trimethylspiro'indole-2,3'-[3H]naphtho[2,1-b]-1,4-oxazine]

2-methyl-3,3'-spiro-bi-[3H-naphtho[2,1-bipyran] (2-Me)

2-phenyl-3-methyl-7-methoxy-8'-nitrospiro[4H-1-benzopyran-4,3'-[3H]-naphtho]2,1-b]pyran Spiro[2H-1-benzopyran-2,9'-xanthene]

8-methoxy-1',3'-dimethylspiro(2H-1-benzopyran-2,2'-(1'H)-quinoline 2,2'-Spiro-bi-[2H-1-benzopyran]

5'-amino-1',3',3'-trimethylspiro[2H-1-benzopyran-2,2'-indoline

Ethyl-β-methyl-β-(3',3'-dimethyl-6-nitrospiro(2H-1-benzopyran-2,2'-indolin-1'-yl)-propenoate (1,3-propanediyl)bis[3',3'-dimethyl-6-nitrospiro[2H-1-benzopyran-2,2'-indoline]

3,3'-dimethyl-6-nitrospiro[2H-1-benzopyrao-2,2'-benzoxazoline]

6'-methylthio-3,3'-dimethyl-8-methoxy-6-nitrospiro[2H-1-benzopyran-2,2'-benzothiozoline]

(1,2-ethanediyl)bis[8-methoxy-3-methyl-6-nitrospiro[2H-1 -benzopyran-2,2'-benzothiozoline]]

N-N'-bis(3,3'-dimethyl-6-nitrospiro[2H-1-benzopyran-2,2'(3'H)-benzothioazol-6'-yl)decanediamide]

-α-(2,5-dimethyl-3-furyl)ethylidene(Z)-ethylidenesuccinic anhydride; α-(2,5-dimethyl-3-furyl)-α',δ-dimethylfulgide 2,5-diphenyl-4-(2'-chlorophenyl)imidazole

[(2',4'-dinitrophenyl)methyl]-1H-benzimidazole

N-N-diethyl-2-phenyl-2H-phenanthro[9,10-d]imidazol-2-amine

2-Nitro-3-aminofluoren 2-amino-4-(2'-furanyl)-6H-1,3-thiazine-6-thione

In addition to achieving uniform depth of colour, it is preferable to achieve a cosmetically attractive marketable colour such as grey or brown, rather than the blue of most commonly known dyes. This requires mixing two or three dyes, often, but not necessarily, from different families to achieve the desired result. Preferably each dye is associated with an absorber, per the method outlined above, so that the transmission level and colour are both uniform across the lens. It is not required that the penetration depth be constant for all activating wavelengths, but it is preferable that it is essentially the same everywhere for every wavelength band in question.

Preferably, a mixture of photochromic dyes may be controlled by the use of a single absorber.

The compatible light absorbing material utilised in the light-transmissible article may be of any suitable type. A UV absorbing material is preferred. A light absorbing material used to produce so-called UV blocking lenses is satisfactory, however the compatible light absorbing material may incidentally be a second photochromic dye which has appropriate covering absorption in the photochrome activation region, with the absorption limit preferred being related directly to the absorbance characteristics of the photochrome. Thus for a photochrome with a maximum absorbance at 360 nm an absorption limit of approximately 380 nm may be appropriate, whereas for one which has its maximum absorbance at 390 nm then one which has an absorption limit significantly greater than this value may be more appropriate. The absorber may be selected such that the cut-off limit of the combination is such that the extreme differences in emerging intensity of integrated UV through thin and thick parts of the lens is no more than about 10% of the mean (preferably about 5%).

More preferably the UV absorbing material may have an absorption characteristic whose peak satisfies the required central wavelength of approximately 385 nm and half-height wavelengths of from approximately 350 to 450 nm. Desirably the absorption drops sharply to zero in the near visible ranges.

Suitable UV absorbers may be selected from one or more of the group consisting of benzotriazoles, benzophenones and cyano-acrylates. The UV absorbers may be selected from one or more of the following:

Ciba Geigy Tinuvin P-[2(2'-hydroxy-5'-methyl-phenyl) benzotriazole]

Cyanamid Cyasorb UV 531 -[2-hydroxy-4-n-acetoxy benzophenome]

Cyanamid Cyasorb UV 5411 -(2(2'-hydroxy-5-5-octylphenyl) benzotriazole]

2(2'-hydroxy-3',6'(1,1-dimethylbenzylphenyl) benzotriazole

2(2'-hydroxy-3',5'-di-t-amylphenyl)benzotriazole bis[2-hydroxy-5-methyl-3-(benzotriazole-2-yl)phenyl]-methane bis[2-hydroxy-5-t-octyl-3(benzotriazole-2-yl)phenyl]-methane Cyanamid UV 2098-[2hydroxy-4-(2acrylocyloxy-ethoxy benzophenone]

National S&C Permasorb MA-[2 hydroxy-4-(2-hydroxy-3-methacryloxy) propoxy benzophenone]

Cyanamid UV 24 [2,2'dihydroxy4-methoxy benzophenone]

BASF Uvinul 400 [2,4-dihydroxy benzophenone]

BASF Uvinul D49 [2,2'-dihydroxy 4,4-dimethoxy benzophenone]

BASF Uvinul D50 [2,2',4,4'tetrahydroxy benzophenone]

BASF Uvinul D35 [ethyl-2-cyano-3,3 diphenyl acrylate]

BASF Uvinul N-539 [2-ethexyl-2-cyano-3,3-diphenyl acrylate]

Ciba Geigy Tinuvin 213

Rhone-Poulenc Anti-UVP (Rhoidialux-P)

2',2',4-trihydroxybenzophenone

Uvinul M493™ from BASF, and commercially available mixtures thereof 2-hydroxy-4-acryloyloxyethoxybenzophenone (polymer)

2-hydroxy-4-acryloyloxyethoxybenzophenone 4-hydroxy-4-methoxybenzophenone 2-hydroxy-4-n-octoxybenzophenone Accordingly, in a further aspect of the present invention there is provided a coating composition for a photochromic light-transmissible article, including a U.V. absorber compatible with the photochromic dye in the light transmissible article; and a carrier therefor.

The coating composition may be provided to generate a pre-selected colour and/or uniform darkening on the light-transmissible article, e.g. lens, to be treated.

The colour modifications may range for example from brown to grey when completely darkened.

The U.V. absorber may exhibit an absorption limit at approximately 380 nm or greater, preferably at greater than approximately 400 nm. It will be understood that a plurality of differing coating compositions may be provided depending on the nature of the lens to be treated and photochromic dye used therein.

Whereas the discussion above has been concerned with the achievement of uniform darkening in a photochromic light-transmissible article such as a lens, other arrangements fall within the scope of the present invention. For example, there is a category of fashion sunglasses or spectacle lenses known as "gradient lenses." Typically, such a lens is tinted to a greater depth of colour in the upper half of the lens than in the lower. This provides sun screening when viewing the distance and a relatively clear lower part for reading. The method of achieving this gradient in a tint bath is well known.

In the case of photochromic lenses, a similar effect may be achieved whether the photochromic dyes are concentrated near the surface, such as for an imbibed lens, or dispersed throughout the body of the lens. We have found it sufficient to take a lens formulated to darken uniformly and dip the lens in a tinting bath carrying UV blocking dye. For sun lens applications where the lenses have no refractive power, a lens with body dispersed photochromic dye need not have body dispersed UV dye, although such treatment is necessary for powered lenses. The lens may be oscillated in and out of the liquid surface so that UV dye impregnates the lens surfaces to a concentration which is graded more or less uniformly from top to bottom.

The UV absorber at the front surface serves to shield the photochromic dyes and depress the penetration depth and intensity of the activating wavelengths. Photochromic darkening is then graded between top and bottom of the lens, independent of the thickness or shape.

U.S. Pat. No. 4,289,497 describes a gradient photochromic lens into which a spiroindoline naphthooxine photochromic dye is imbibed from solution and UV dye is subsequently incorporated by gradient tinting. Whilst this discloses a method by which the desired gradient function can be achieved, it does not avoid the step of imbibing at high temperature through the lens surface and, to applicant's knowledge, has never been commercialised.

The components of a laminated lens system may be manufactured according to the present invention outlined here. Accordingly the light-transmissible article may comprise a laminate layer to be utilised in such a system. Only one laminate component may be so formulated. It is preferred that the front component be non-UV absorbing and the rear component photochromic and UV absorbing so that the reservoir of photochromic dye activated in a laminated lens is located at the center of the composite lens and thereby furthest from the effect of oxygen or moisture as previously described.

In this embodiment, it is preferable to apply a relatively thick layer of a coating material to one or both of the surfaces to be laminated and to cure that material prior to packaging the laminate components for sale. This coating may be in the range 50 to 100 μm thick. Characteristic surface roughness of such coatings generally precludes their usage as optical surfaces and, hence, an individual lens component or wafer is not useable on its own as a spectacle lens. When, however, such components are combined by gluing with an adhesive of matched refractive index, the irregularities of the mating surfaces are in-filled and the final product is entirely acceptable for ophthalmic use.

The coating material may be chosen as required, provided the mechanical requirements for successful bonding are met. In one instance, we require only that the coating be impervious to atmospheric moisture so that the wafer components are physically stable during transport and storage (Applicant's British patent Appln. No. 9403792.6). More preferably, a polyurethane material may be utilised as the polymeric material in the light-transmissible article. This layer will eventually be entrapped at the bond line of the laminated lens. This preference arises for the following reasons:

(1) Improved impact strength of the structure,
(2) Ability to hold photochromic dyes within the encapsulating interlayer material,
(3) Ability to provide UV blocking characteristics by formulation of the interlayer,
(4) Provision of good tintability by the coating itself.

The present invention will now be more fully described with reference to the accompanying figures and examples. It should be understood, however, that the description following is illustrative only and should not be taken in any way as a restriction on the generality of the invention described above.

BRIEF DESCRIPTION OF THE DRAWINGS

In the Figures:

FIG. 3 is a known transmission vs. wavelength plot.

FIG. 4 is a known lens.

FIG. 8 is a similar plot to FIG. 5 illustrating the complete overlap between the photochromic dye CG1 and UV400-type absorber Cyasorb UV24.

DETAILED DESCRIPTION

EXAMPLE 1

A photochromic optical lens was produced utilising a standard Spectralite-type monomer blend of polyoxyalkylene glycol diacrylate or dimethacrylate monomer; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups were mixed together in the presence of a hindered amine light stabiliser (HALS) to form a Spectralite-type blend of monomers substantially as described in Australian Patent 641750 (to applicants), the entire disclosure of which is incorporated herein by reference.

The blend includes 0.05 wt % of a chromene photochromic dye and 0.16 wt % of a compatible UV absorbing material which is also a Fulgide photochromic dye and a lens cast therefrom utilising standard casting techniques.

Figure 5:
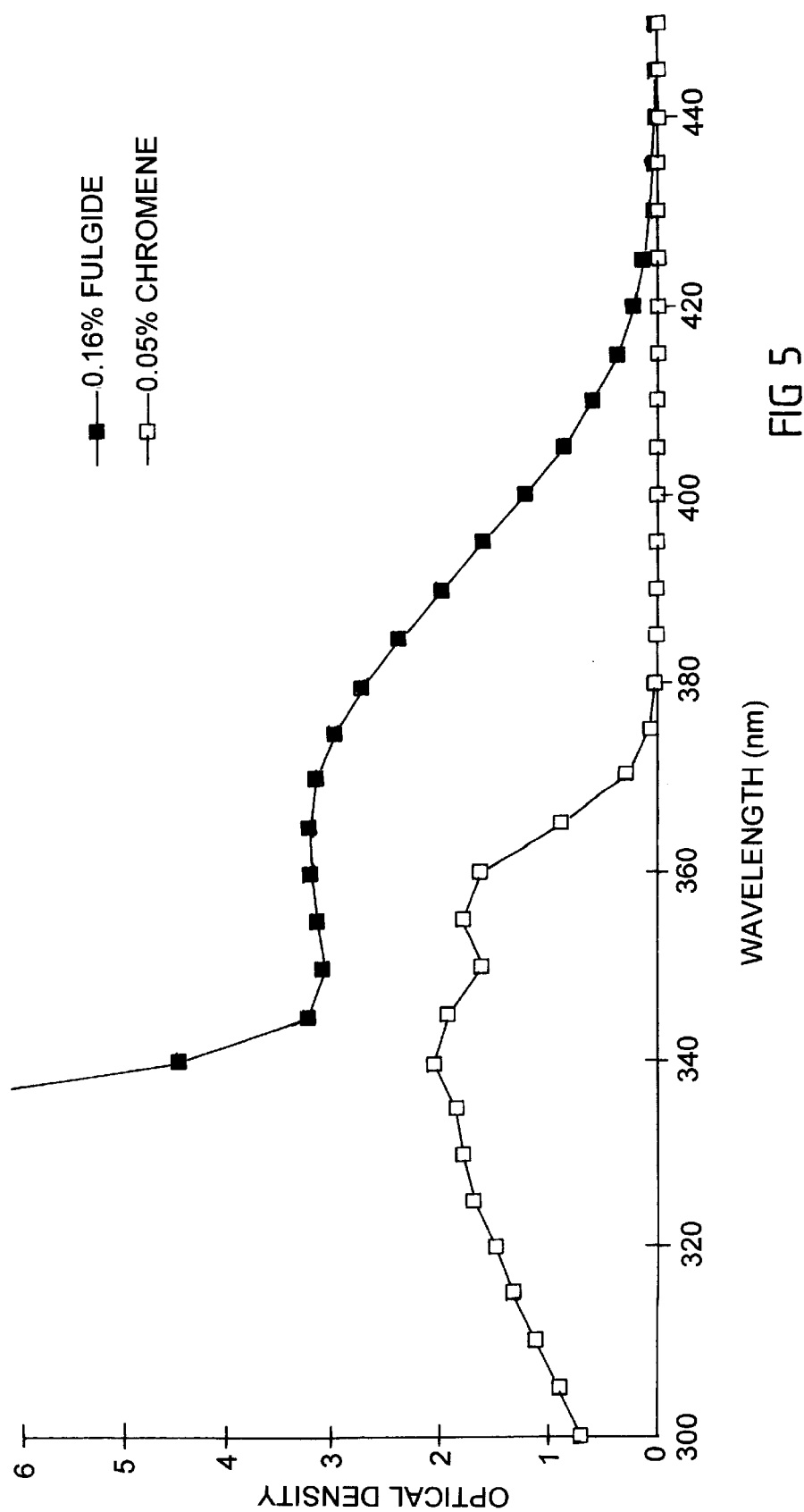
FIG. 5 is a plot of Optical Density (OD) versus Wavelength illustrating the overlap in the photochromic activation region of the Absorbance Spectra of a typical Fulgide (Black Squares) and a Typical Chromene (hollow squares).

The absorbance spectra of the photochromic dye and the compatible UV absorbing material are shown in FIG. 5.

An evenly coloured grey lens is produced with no evidence of the so-called bulls eye effect on exposure to light.

Figure 1:
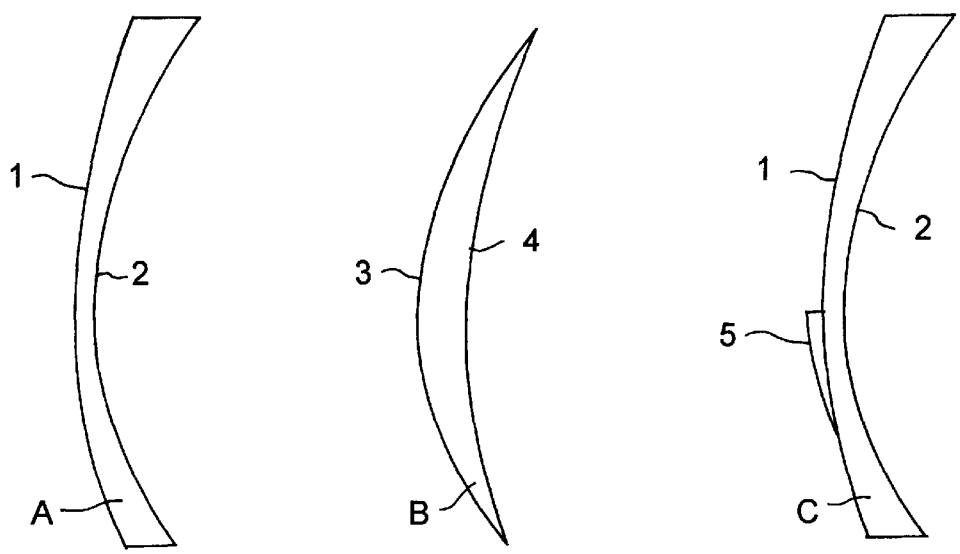
FIG. 1 is a known spectacle lens.
Figure 2:
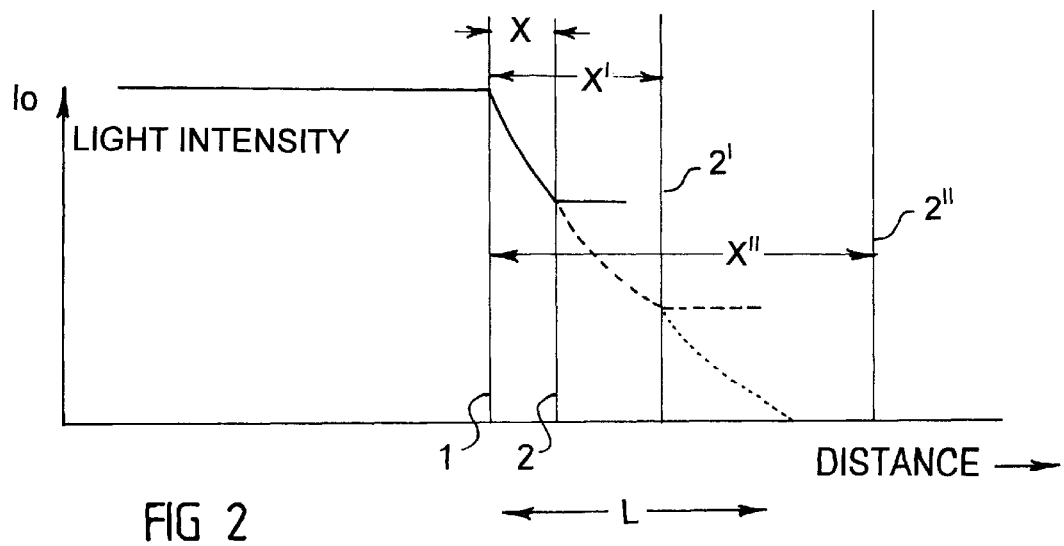
FIG. 2 is a known intensity vs. distance plot.

The reason for evenness of colour is apparent from FIG. 1 given the overlap of spectra of the photochromic dye and UV absorbing photochromic dye in the photochromic activating region.

EXAMPLE 2 (Comparative)

A photochromic optical lens was produced in a manner similar to Example 1 except that the photochromic dye introduced is 0.05 wt % of CG1, a red colouring photochrome whose structure is given below and the UV absorbing material is 0.05 wt % of a blue colouring photochromic BuPW8, whose structure is given below.

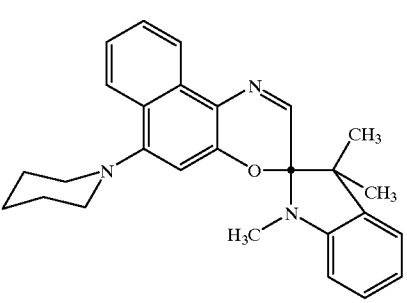
CG1

-continued

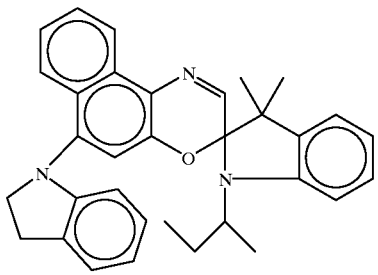

BuPW8

Figure 6:
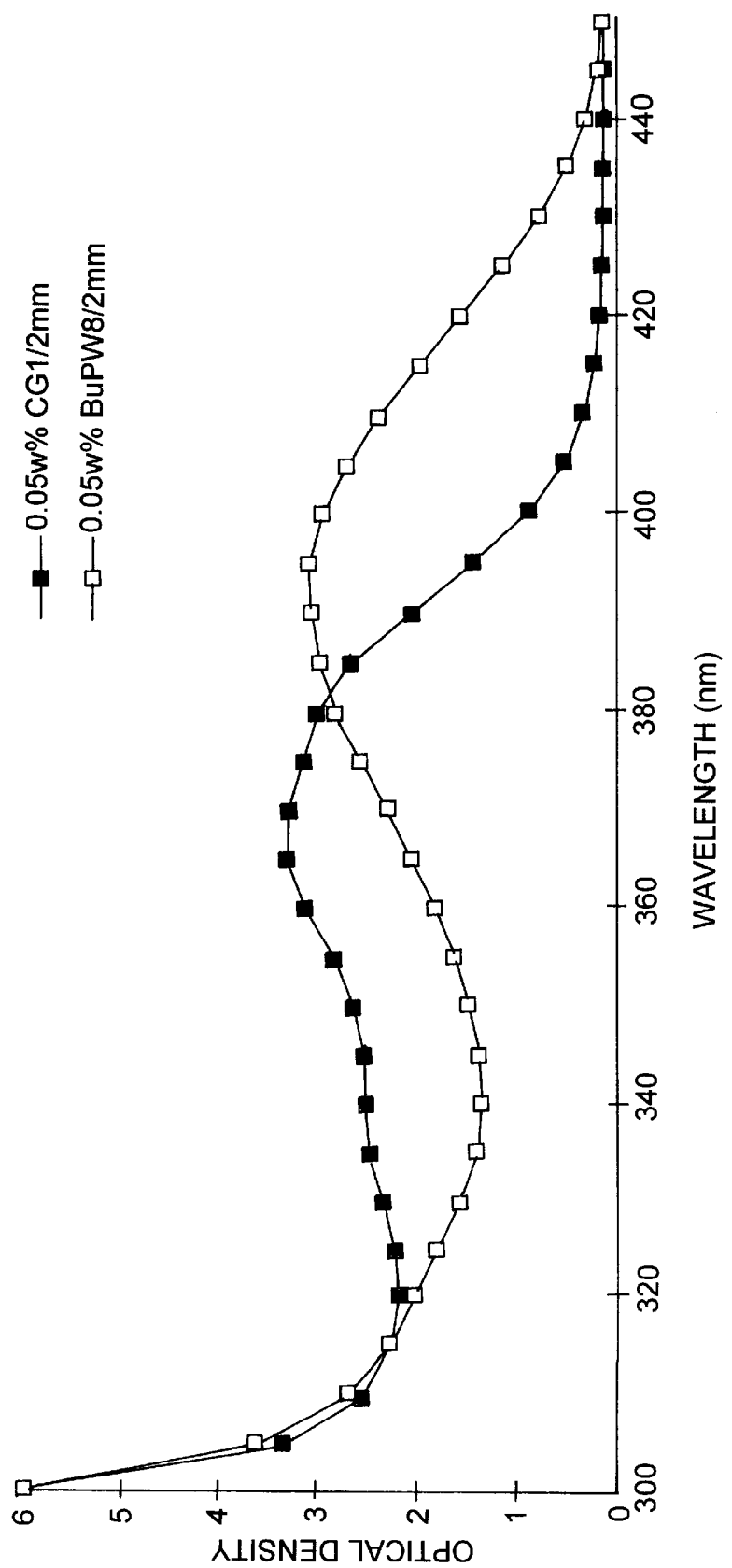
FIG. 6 is a similar plot to FIG. 5 illustrating the partial overlap only in the Absorbance Spectra of dyes CG1 and BuPW8, as described below, in the photochromic activation region.

The resulting blue lens exhibits unacceptable uneven colour on photochromic activation. The reason for this is again apparent from the lack of overlap in absorbance spectra of the two dyes (FIG. 6).

EXAMPLE 3

A photochromic optical lens was produced in a manner similar to Example 1 except that the UV absorbing material is a combination of 0.03% BASF Uvinul D-49, a dihydroxy benzophenone and 0.005% Anti-UVP (AUVP), (Rhone-Poulenc), a monohydroxybenzophenone.

Figure 7:
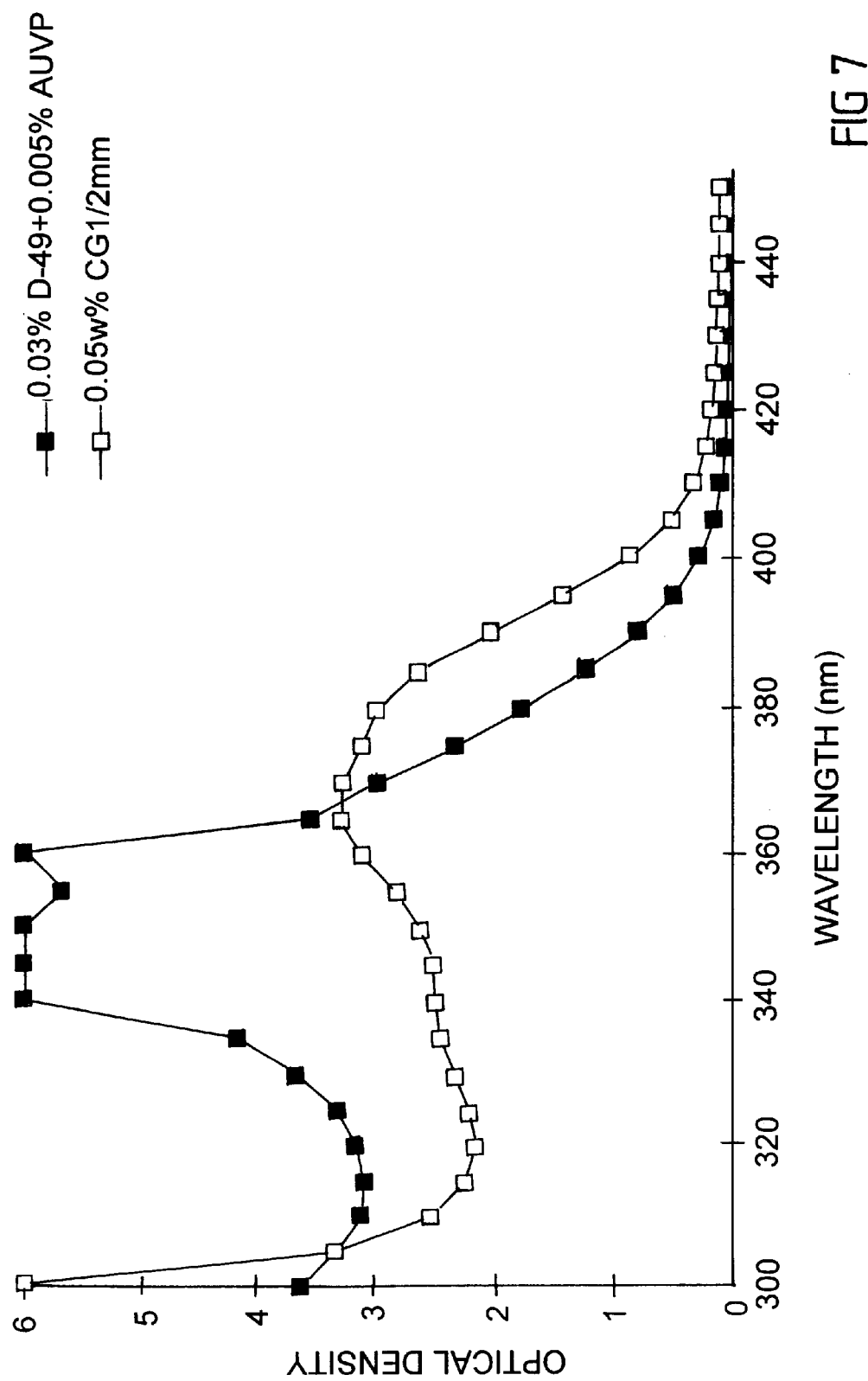
FIG. 7 is a similar plot to FIG. 5 illustrating the improved, but still partial overlap between the photochromic dye CG1 and UV absorbers D-49 and AUVP, as described below.

The absorbance spectra of the UV absorbing material and the photochromic dye CG1 are given in FIG. 7 showing increased coverage by the UV absorbing material.

A lens showing a relatively even blue colour on photochromic activation is provided.

EXAMPLE 4

A photochromic optical lens was produced in a manner similar to Example 1 except that the UV absorbing material is a UV400-type absorber (i.e. an absorber which permits less than 5% T at 400 nm for a 1.8 mm section). The absorber used was a dihydroxybenzophenone Cyasorb UV24.

The absorbance spectra of the UV absorbing material and the photochromic dye CG1 are given in FIG. 8 showing complete coverage by the UV absorbing material. A lens showing a good even blue colour on photochromic activation is provided.

Finally, it is to be understood that various other modifications and/or alterations may be made without departing from the spirit of the present invention as outlined herein.

We claim:

1. A light-transmissible article exhibiting variations in length or thickness or local changes in surface shape formed from a polymeric material, which article includes at least one photochromic dye; and a compatible light absorbing material that exhibits substantial overlap of its absorbance spectrum with the spectrum of the at least one photochromic dye and that is distributed on or within the article; the photochromic dye and compatible light absorbing material are present in amounts effective to cause the depth of darkening of the article upon activation of the at least one photochromic dye to be substantially uniform regardless of variations in length, or thickness or local changes in surface shape.

2. A light-transmissible article according to claim 1 wherein the concentrations of photochromic dye and compatible light absorbing material are such that the maximum difference in light intensities emerging from different surfaces of the article distal the light source is less than approximately 10% of the total intensity of light absorbed by the article as the light passes through the article.

3. A light-transmissible article according to claim 2 wherein the difference in light intensities is less than approximately 5% of the total intensity absorbed during passage through the article.

4. A light-transmissible article according to claim 2 including
approximately 0.001% to 0.25% by weight, based on the total weight of the article of the photochromic dye; and
approximately 0.001% to 1.0% by weight, based on the total weight of the article of the compatible light absorbing material.

5. A light-transmissible article according to claim 1 wherein the light-transmissible article is formed from a cross-linkable polymeric casting composition including a diacrylate or dimethacrylate monomer and a polymerisable comonomer.

6. A light-transmissible article according to claim 5 wherein the polymerisable comonomer is selected from the group consisting of methacrylates, acrylates, vinyls, vinyl ethers, allyls, aromatic olefins, ethers, polythiols and epoxies.

7. A light-transmissible article according to claim 2 wherein the photochromic dye is a dye activated by near ultraviolet light in the range of wavelengths from approximately 320 nm to 450 nm.

8. A light-transmissible article according to claim 7 wherein the photochromic dye is selected from one or more of the group consisting of anthraquinones, phthalocyanines, spiro-oxazines, chromenes, pyrans and fulgides.

9. A light-transmissible article according to claim 8 wherein the compatible light absorbing material is an ultraviolet (UV) absorbing material having an absorption limit of at least approximately 380 nm.

10. A light-transmissible article according to claim 9 wherein the UV absorbing material has an absorption limit of approximately 400 nm.

11. A light-transmissible article according to claim 10 wherein the UV absorbing material is selected from one or more of the group consisting of benzotriazoles, benzophenones and cyano-acrylates.

12. A light-transmissible article according to claim 1 wherein the light-transmissible article is an ophthalmic lens.

13. A light-transmissible article according to claim 1 wherein the at least one photochromic dye and the compatible light material are uniformly dispersed in the lens.

14. A light-transmissible article according to claim 2 wherein the light-transmissible article is an ophthalmic lens having a front surface and a back surface and wherein the maximum difference in visible light intensities emerging from the back surface is less than approximately 10% of the total intensity of visible light absorbed by the lens as the visible light passages through the lens from the front surface.

15. A light-transmissible article according to claim 14 wherein the at least one photochromic dye and the compatible light material are uniformly dispersed in the lens.

16. A light-transmissible article according to claim 14 wherein the difference in light intensities is less than approximately 5% of the total intensity absorbed during passage through the lens.

17. A light-transmissible article according to claim 14 including approximately 0.001% to 0.25% by weight, based on the total weight of the lens of the photochromic dye; and
approximately 0.001% to 1.0% by weight, based on the total weight of the lens of the compatible light absorbing material.

18. A light-transmissible article according to claim 14 wherein the lens is formed from a cross-linkable polymeric casting composition including a diacrylate or dimethacrylate monomer and the polymerisable comonomer.

19. A light-transmissible article according to claim 18 wherein the polymerisable comonomer is selected from the group consisting of methacrylates, acrylates, vinyls, vinyl ethers, allyls, aromatic olefins, ethers, polythiols and epoxies.

20. A light-transmissible article according to claim 14 wherein the photochromic dye is a dye activate by near ultraviolet light in the range of wavelengths from approximately 320 nm to 450 nm.

21. A light-transmissible article according to claim 20 wherein the photochromic dye is selected from one or more of the group consisting of anthraquinones, phthalocyanines, spiro-oxazines, chromenes, pyrans and fulgides.

22. A light-transmissible article according to claim 21 wherein the compatible light absorbing material is an ultraviolet (UV) absorbing material having an absorption limit of at least approximately 380 nm.

23. A light-transmissible article according to claim 22 wherein the UV absorbing material has an absorption limit of approximately 400 nm.

24. A light-transmissible article according to claim 23 wherein the UV absorbing material is selected from one or more of the group consisting of benzotriazoles, benzophenones and cyano-acrylates.

* * * * *